No. 891,247. PATENTED JUNE 23, 1908.
R. A. GRISWOLD.
WAGON BRAKE.
APPLICATION FILED AUG. 31, 1907.
2 SHEETS—SHEET 2.
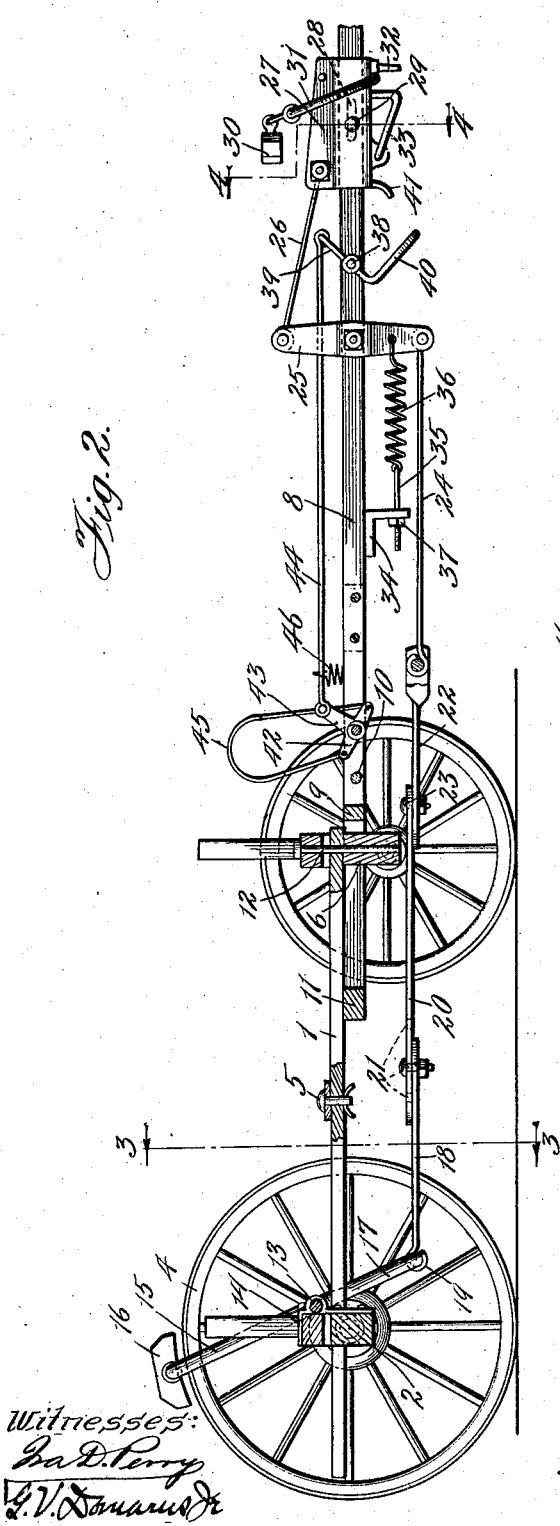
Witnesses:
Inventor:
Rolla A. Griswold
By O. R. Barnett Atty.

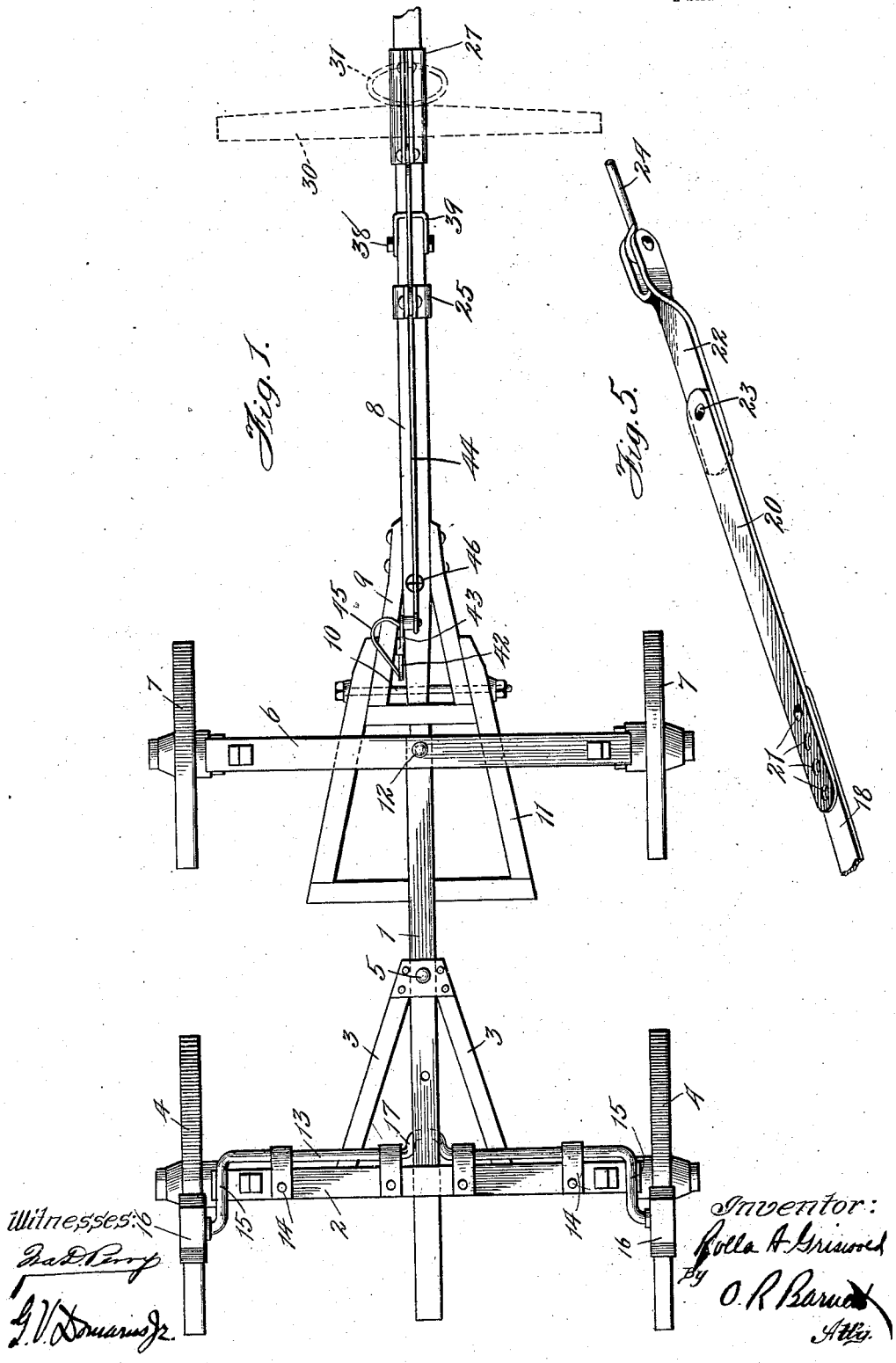

UNITED STATES PATENT OFFICE.

ROLLA A. GRISWOLD, OF DUNDEE, ILLINOIS.

WAGON-BRAKE.

No. 891,247.    Specification of Letters Patent.    Patented June 23, 1908.

Application filed August 31, 1907. Serial No. 390,901.

*To all whom it may concern:*

Be it known that I, ROLLA A. GRISWOLD, a citizen of the United States, residing at Dundee, in the county of Kane and State of Illinois, have invented certain new and useful Improvements in Wagon-Brakes; of which the following is a specification.

My invention relates to wagon brakes and particularly to the type of brakes which are automatically set by the holding back of the horses, and has for its object to simplify and improve apparatus of this character.

My invention has for a further object to provide a new and improved device for locking the brake setting apparatus, so that in backing, for example, the holding back of the animals will not cause the brake to be set, such locking apparatus being provided with means by which it is held either in its locking or releasing position.

My invention has for a further object to provide an elastic device, the tension of which may be regulated, and in which is included the brake setting device, against the tension of which the brakes are set.

My invention has for further objects such new and improved constructions in automatic wagon brakes as will be described in the following specification and particularly set forth in the claims appended thereto.

The invention is illustrated in one embodiment thereof in the accompanying drawings, in which Figure 1 is a plan view of the running gear of a wagon of ordinary type with my automatic brake apparatus attached thereto. Fig. 2 is a side view with parts in elevation and parts in section. Fig. 3 is an end view. Fig. 4 is a section on the line 4—4 of Fig. 2, looking in the direction of the arrows; and Fig. 5 is a detail in perspective of the connecting rod.

Like characters of reference indicate the same parts in the several figures of the drawings.

The numeral 1 represents the reach, 2 the rear axle, 3 the rear hounds, and 4, 4 the rear wheels; the wagon being capable of being lengthened out or shortened in the ordinary way by setting the rear axle at different positions on the reach by means of bolt 5, which extends through one of the perforations in the reach.

6 represents the front axle, 7, 7 the front wheels, 8 the pole having at its inner end the triangular frame 9 which is pivoted by a bolt 10 in the hounding frame 11 on the front axle, the latter being connected with the reach by the ordinary king pin 12.

A brake shaft 13 is rotatably mounted in keepers 14 on the rear axle and has the brake arms 15, 15 on which are the brakes 16, 16. Brake shaft 13 is looped to form a crank 17 for attachment of the operating rod. This rod I prefer to make in four sections, the rear section 18 having a loop 19 for the crank and being bolted to the next section forward 20, which latter is provided with a series of perforations 21, so that the length of the operating rod may be changed when the distance between front and rear axles is varied. Section 20 is pivoted to another section 22 upon the bolt 23, section 22 being formed with a bifurcated end in which is pivoted the front section 24 of the operating rod which is connected with the end of a lever 25 pivoted upon the pole 8. To the upper arm of lever 25 is pivoted a rod 26 connecting with a thimble 27 which slides upon the end of the pole and may be guided in this movement by a slot 28 in the pole through which passes a bolt 29. The neck yoke 30 has a ring 31 which may be slipped over the thimble 27 and held between a downwardly projecting bolt 32 and a projecting part 33. It will be seen that when the horses hold back for any reason, for example in going down hill, the thimble will slide back on the pole, rocking lever 25 so as to set the brakes 16 against the rear wheel.

I prefer to interpose in the brake setting apparatus an elastic device against which the brakes will be set, the tension of which device may be regulated. In this manner the brakes are set only when there is a certain amount of back pull, which amount may be varied. To carry out this idea, I provide a bracket 34 on the under side of the pole perforated to receive a rod 35 to which is attached a spring 36 connected also to lever 25. By means of a nut 37 the tension of the spring may be regulated.

In order that the brakes may not be set when the wagon is to be backed, I provide an engaging or locking device to prevent the thimble from sliding back on the pole and associate with such device means by which it may be conveniently operated from the wagon seat and means by which it may be held either in its locking position or in its disengaged position with respect to the thimble. Pivoted to the pole on bolt 38 is a lever 39 provided with an angular projection 40 adapted to engage, when in horizontal position, with a lug 41 on the under side of the thimble. Pivoted on the pole near its inner end is the rock arm 42 having a perpendicular projection 43 to which is connected a rod 44 extending to lever 39. A cord 45 is attached at each end to opposite ends of the rock arm 42, or, of course, separate cords might be used. By this means the rock arm may be turned back and forth so as to throw projection 40 into or out of the path of lug 41. Various means have been devised in apparatus of this general character for clamping the operating rod of the brakes so as to hinder the setting of the brakes in backing. My locking apparatus, it will be observed, when in its engaging position acts as a stop positively preventing the backward slide of the thimble. Preferably I attach a coiled spring 46 to the upper side of the pole, this spring having a loop extending around the connecting rod 44. This spring tends to hold the locking device either in its engaged or disengaged position. It, therefore, is not necessary to keep a hold on the locking mechanism when backing. It is necessary in either case simply to set the locking device in one position or the other.

My apparatus operates as follows: The horses are attached to the wagon in the ordinary way. The ring of the neck yoke being slipped between bolt 32 and projecting part 33, when there is a back pull on the neck yoke, for example, in going down hill, the yoke pulls back against the thimble and the thimble slides backward on the pull, provided the locking device is set in its disengaged position, as shown in Fig. 2. The backward movement of the thimble rocks lever 25 and throws the brakes backward against the wheels. It will be seen that the pole and front axle may be turned without interfering with the brake setting apparatus, the latter operating equally well when the wagon is on a turn. The pole may also be tilted upward without obstruction as far as it is customary to do this. When the wagon is lengthened it is only necessary to change the bolt connecting the rear sections of the operating rod.

I wish it to be understood that I do not desire to limit myself to the particular devices and constructions herein shown and set forth, as obvious modifications will occur to those skilled in the art, which modifications will still be within the scope of my invention.

I claim:

1. The combination with a wagon having a pole, of a brake, a thimble slidably arranged on the end of the pole and having a stop-abutting part projecting outwardly from the thimble, connections between the thimble and the brake whereby back pressure on the thimble sets the brake, an angular stop pivoted to the pole rearwardly of said thimble, and means for turning the stop to bring the end thereof into the path of the stop-abutting part and holding the same in such position so as to prevent a backward brake-setting movement of the thimble or for rocking said stop so as to allow said projecting part to pass the same.

2. The combination with a wagon having a pole, of a brake, a thimble slidably arranged on the end of the pole and having a downward projection on the under side thereof, connections between the thimble and the brake whereby back pressure on the thimble sets the brake, an angular stop device pivoted to the pole rearwardly of said thimble, means for turning said stop so that it will stand in the path of the projecting device or rocking the same so that it will allow the projection to pass, a rod to operate said angular stop, and means for holding said rod and stop in either of their positions.

3. The combination with a wagon having a pole, of a brake, means for setting the brake by back pressure comprising a device slidably mounted on the pole; a stop for said sliding device pivoted to the pole, a rock arm pivoted to the pole, a connecting rod between the rock arm and the stop, means for turning said rock arm, and a spring engaging with the connecting rod whereby the stop is held either against said sliding device or out of the path thereof.

4. The combination with a wagon having a pole, of a brake shaft rotatably mounted on said wagon, a brake upon said shaft, a crank upon said shaft, a lever pivoted to the pole, connections from the lever to the crank, a device slidably mounted upon the pole, a connection from the sliding device to the lever, a spring connected with the lever and adjustably connected with the pole against the tension of which the lever is rocked, and means adapted to be set to prevent said sliding device from movement upon the pole.

5. The combination with a wagon having a pole, of a brake, a thimble slidably arranged upon the end of the pole, a lever pivoted to the pole, a rod connecting the thimble with the lever, connections from the lever to the brake whereby a backward movement of the thimble rocks the lever and sets the brake, an angular stop pivoted to the pole, a rotatable device on the pole, an operating rod connecting the rotatable device and the stop by means of which the stop may be moved into or out of the path of the thimble, and a spring engaging with said operating rod so as to lock the stop in either position.

6. The combination with a wagon having a pole, of a brake, a thimble slidably arranged on the end of the pole, a lever pivoted to the pole, a rod connecting the thimble with one end of the lever, rigid connections from the other end of the lever to the brake, a bracket on the pole, a spring adjustably interposed between the bracket and the lever and adapted to be put under tension by a backward setting movement of the thimble, and a stop adapted to engage with the thimble so as to prevent backward movement thereof.

7. The combination with a wagon having a pole, of a brake, means for setting said brake by back pressure comprising a device slidably mounted upon the pole and having projections on the under side thereof to receive the ring of the neck yoke of said wagon, a lug on the under side of said sliding device, a stop pivoted on the pole, means for turning said stop so as to be engaged by said lug, and means for holding said stop in its engaging position.

ROLLA A. GRISWOLD.

Witnesses:
WILLIAM M. LUECK,
EDWARD J. LUECK.